United States Patent

[11] 3,593,115

[72] Inventors Herbert Dym;
Robert V. Mazza, both of Mahopac, N.Y.
[21] Appl. No. 856,745
[22] Filed Sept. 10, 1969
[45] Patented July 13, 1971
[73] Assignee International Business Machines Corporation
Armonk, N.Y.
Continuation-in-part of application Ser. No. 837,820, June 30, 1969, now abandoned.

[54] CAPACITIVE VOLTAGE DIVIDER
34 Claims, 4 Drawing Figs.

[52] U.S. Cl. .......... 323/93, 178/19, 317/249 R, 317/261, 340/200
[51] Int. Cl. .......... H01g 7/00, G08c 19/10, G08c 21/00
[50] Field of Search .......... 178/18—20; 340/200; 317/249, 261; 323/93

[56] References Cited
UNITED STATES PATENTS

| | | | |
|---|---|---|---|
| 2,968,952 | 1/1961 | Stalder | 323/93 X |
| 3,312,892 | 4/1967 | Parnes | 323/93 |
| 3,399,401 | 8/1968 | Ellis et al. | 178/18 X |

*Primary Examiner*—J. D. Miller
*Assistant Examiner*—A. D. Pellinen
*Attorneys*—Hanifin and Jancin and John A. Jordan ABSTRACT: A capacitive voltage divider arrangement for driving a position transducer. Individual ones of a first plurality of individual capacitor plates are respectively capacitively coupled to individual ones of a second like plurality of capacitance plate areas, the second plurality of capacitive areas being conductively connected together and varying in area from plate area to plate area. Individual ones of a third plurality of capacitance plate areas, which are conductively connected together, are likewise respectively capacitively coupled to individual ones of the first plurality of plates. The voltage distribution on a plurality of position sensing grid lines, individual ones of which are connected to respective individual ones of the first plurality of plates, varies in accordance with the varying in areas from plate area to plate area of the second plurality of plate areas.

INVENTORS
HERBERT DYM
ROBERT V. MAZZA

BY John A. Jordan
ATTORNEY

CAPACITIVE VOLTAGE DIVIDER

BACKGROUND OF THE INVENTION

This application is a continuation-in-part of copending application Ser. No. 837,820, filed June 30, 1969 and now abandoned.

The present invention relates to a capacitive voltage divider arrangement for use in a position transducer for handprint data entry and the like.

Electronic position transducers, and more particularly electronic writing tablets, employing a tablet-stylus arrangement are well known in the art. A variety of techniques have been employed for electronically determining in time the position of the stylus as it is moved across the surface of the tablet. Some of these techniques have been summarized in copending application Ser. No. 772,295, filed Oct. 31, 1968 and assigned to the same assignee as the preser ıvention.

As stated in the above-cited application, both analog and digital techniques have been employed to drive the position transducing tablet. One approach used in analog voltage driven tablets is to use some form of voltage division arrangement where the voltage drop of the driving voltage is a function of position.

One of the difficulties of the analog voltage divider arrangement is obtaining a voltage drop which is a linear function of position. In this respect conventional forms of resistive dividers may, in some instances, provide adequate linearity but such are bulky, expensive and difficult to fabricate. On the other hand the less costly, less bulky and simpler forms, such as photoetched and the like type resistive dividers, do not always provide good linearity as it is difficult to fabricate a thin layer of resistance which is of uniform resistivity. In general, it may be said that resistive dividers are susceptible to heat and reliability problems as well as presenting manufacturing, fabrication and packaging problems. For that matter, in either the analog divider or digital type tablets, known heretofore in the art, a break in one of the X-Y grid voltage distribution lines during fabrication or use would effect an open circuit and loss of voltage at that point, thus affecting accuracy and reliability.

In accordance with the principles of the present invention there is provided a novel capacitive voltage divider for a position transducer which is simple, inexpensive and easy to fabricate and which exhibits linearity in the amplitude of its voltage division as a function of position, low power loss and high reliability. The novel capacitive divider of the present invention basically comprises a first plurality of parallel capacitors with one of the plates of each capacitor all conductively coupled together and varying in area in accordance with the desired voltage function to be sensed in space. Thus, to obtain a monotonical voltage increase as a function of position, the areas would be made to progressively increase.

Coupled respectively to the other plate of each of the capacitors are respective grid lines distributed over the transducer position sensing surface. A second like plurality of capacitors, which capacitances are the complement of the first plurality, may also be employed with said first plurality to provide good linearity and a means of obtaining a reference potential. In addition, a second set of first and second plurality of capacitors connected to the respective grid lines insures high reliability, accuracy and simplicity in fabrication.

Accordingly, it is an object of this invention to provide an improved voltage divider for a position transducer.

It is a further object of this invention to provide a capacitive voltage divider for use in a position transducer.

It is a further object of this invention to provide a position transducer which provides linearity in the voltage sensed as a function of position.

It is yet another object of this invention to provide a voltage divider for a position transducer which is simple, inexpensive and easy to fabricate.

It is still a further object of this invention to provide a voltage divider for a position transducer which exhibits low power loss and high reliability.

It is still yet a further object of this invention to provide a voltage division impedance distribution network for the position transducer writing tablet of a graphic data entry terminal which is thin, light, flexible and easily and inexpensively fabricated.

The foregoing and other objects, features and advantages of the invention will be apparent from the following more particular description of preferred embodiments of the invention, as illustrated in the accompanying drawings.

Figure 1:
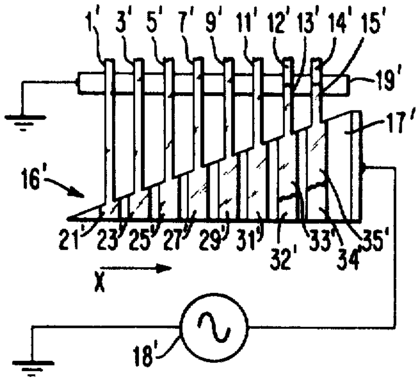
FIG. 1 shows a single axis version of the capacitive voltage divider position transducer in accordance with the principles of the present invention.

In the single direction position transducing arrangement shown in FIG. 1 a plurality of conductive grid lines or strips 1'—15' are shown conductively connected to the respective capacitor plates 21'—35'. Plates 21'—35' may be of the same material as and integral with the conductive grid lines so that the grid lines merely widen at the ends thereof into capacitive coupling pads. Position sensing in FIG. 1 is in the X-direction, as indicated by the arrow. Between each of the respective plates 21'—35' and triangular plate 17' beneath these plates there is provided a layer of dielectric such that each of the plates 21'—35' are capacitively coupled to plate 17' so as to provide an array of capacitances 16' wherein one of the capacitance plates 17' of each capacitance of the array of capacitances is of integral form. The cutaway portions of plates 33' and 35', for example, show dielectric at 32' and 34'.

Also capacitively coupled to each of the grid lines 1'—15' is plate 19' acting to provide a fixed capacitance voltage division path to ground for each grid line with the grid lines, it is clear, the by acting as voltage taps for the divided voltage. Thus, between each of the grid lines 1'—15' and plate 19' there is provided dielectric, as shown for example at 12' and 14', which is uniform in thickness across the array.

As shown in FIG. 1 the area of the respective capacitance plates of the array of capacitances 16' increase in size in the X-direction. Accordingly, when plate 17' is energized by AC source 18', the voltage appearing on the respective conductive grid lines 1'—15', increases in the same direction. Thus, it can be seen that voltage changes as a function of position in the X-direction because of the geometry of plate 17'. With each plate 21'—35' of equal width and equally spaced in the X-direction the output voltage sensed on grid lines 1'—15' changes from grid line to grid line, and therefore with position, according to the nonlinear function, $$Vo(X)=\frac{C_{x_i}}{C_f+C_{x_i}}$$

where $C_{x_i}$ represents the particular capacitance between individual ones of respective plates 21'—35' and plate 17' and $C_f$ represents a fixed capacitance between the individual grid lines 1'—15' and plate 19' which is grounded. In this respect $C_f$ is made large as compared to any stray capacitance to ground.

It is clear, however, that the output voltage can be made to vary linearly with position by adjusting the parameters of the FIG. 1 arrangement to compensate for the nonlinearity of the $$\frac{C_{x_i}}{C_f+C_{x_i}}$$

function. Thus, the spacing between or the areas of the respective plates 21′—35′ can be made to successively vary nonlinearly to compensate for the nonlinearity of this function. It is evident that in addition to a linear voltage response and the nonlinear $$\frac{C_{x_i}}{C_t+C_{x_i}}$$

response, the parameters may be varied in FIG. 1 to provide any of a variety of nonlinear output voltage responses as a function of position in the X-direction. In addition, it is clear that plate 17′ does not have to be an integral unit nor triangular in shape. Thus, plate 17′ may be replaced by any of a variety of arrangements so long as plate areas equivalent to those portions of plate 17′ which are the projection of each of counterpart plates 21′—35′, are conductively coupled together and vary in area in accordance with the desired voltage function to be sensed on grid lines 1′—15′.

Figure 2:
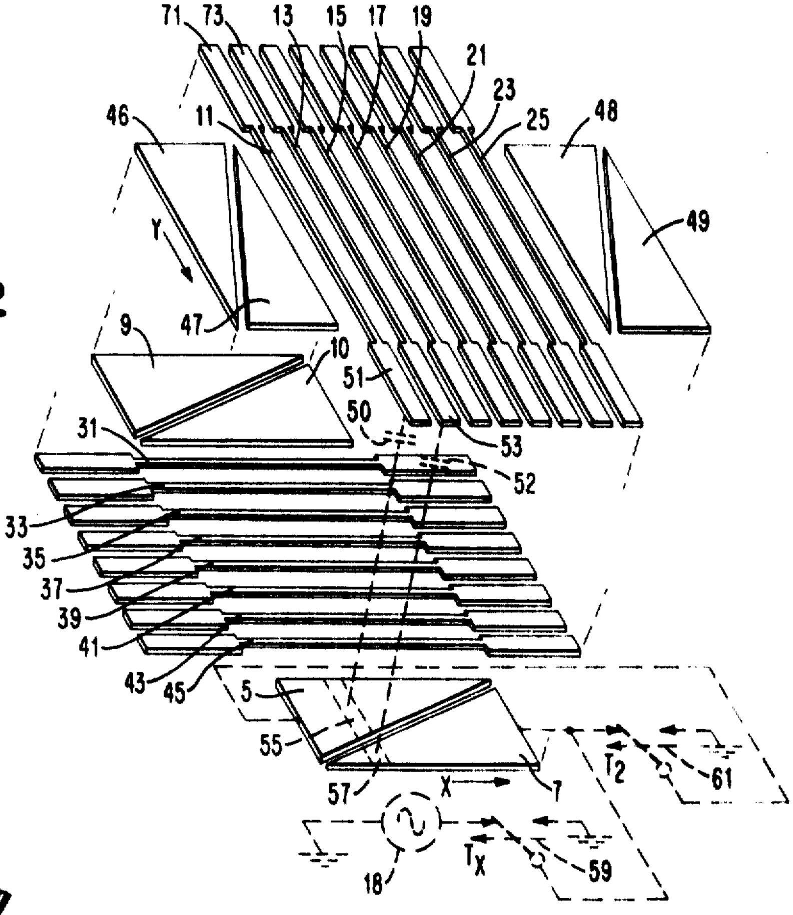
FIG. 2 shows a two-dimensional capacitive voltage divider position transducer arrangement in accordance with the principles of the present invention.

In FIG. 2 there is shown an exploded view of a capacitive voltage divider arrangement for sensing position in both the X and Y directions, as indicated by the arrows adjacent plates 7 and 46, respectively. However, instead of the single triangular X-drive plate arrangement shown in FIG. 1 at 17′, there is shown complementary pairs of triangular drive plates as shown, for example, by complementary X-drive plates 5 and 7 in the lower part of FIG. 2. The purpose of the complementary arrangement will be explained more fully hereinafter.

In addition to complementary pair of X-drive plates 5 and 7, the arrangement of FIG. 2 also employs a redundant complementary pair of X-drive plates, 9 and 10. The purpose of this second complementary pair of plates is to insure high reliability in position sensing, as well as balance and symmetry. According to the redundant arrangement in FIG. 2 if any one of X-direction grid lines 11—25 breaks, both segments of the broken grid line would still continue to provide a voltage for sensing position. Thus, drive plates 9 and 10 are voltage driven simultaneously with plates 5 and 7, respectively. Accordingly, as shown in FIG. 2, complementary pair X-drive plates 5—7 and 9—10 act respectively with capacitor plates 51, 53, etc. and 71, 73, etc. to capacitively couple in varying amounts the transducer drive signal from AC source 18 to X-direction sensing grid lines 11—25 via an interposed dielectric medium, not shown.

In addition to the set of complementary pairs of X-drive plates, 5—7 and 9—10, respectively, the arrangement of FIG. 2 also employs a set of complementary pairs of Y-drive plates, 46—47 and 48—49. The set of complementary pairs of Y-drive plates function in the same manner as the set of complementary pairs of X-drive plates. In this respect grid lines 31—45 provide the voltage distribution arrangement necessary for voltage sensing in the Y-direction. It should be recognized that in the arrangement shown in FIG. 2, drive plates 5 and 7 may be used without counterpart plates 9 and 10 or Y-drive plates 46—49 where Y-direction sensing or redundancy is considered unnecessary.

As will be explained more fully with reference to FIG. 4, the transducer tablet of FIG. 2 may be fabricated by depositing the X-grid lines 11—25 with their corresponding capacitor plates 51, 53, 71, 73, etc. and Y-drive plates 46—49 on one side of a dielectric sheet and the Y-grid lines 31—45 with their corresponding capacitor end plates and X-drive plates 5, 7, 9 and 10 on the other side of the sheet. Capacitors 50 and 52, shown in dotted line form in FIG. 2, represent the respective capacitances between plates 51 and 53 and the respective sections 55 and 57 of complementary plates 5 and 7.

Figure 3:
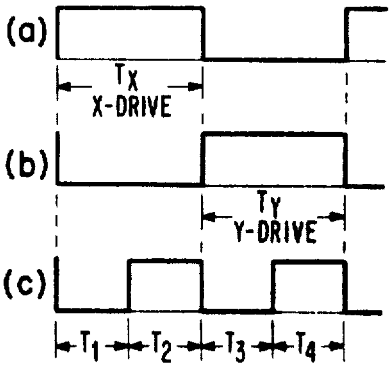
FIG. 3 shows the relationship of the time intervals during which the drive plates of the arrangement in FIG. 2 are energized.

In FIG. 3 there is shown a timing arrangement exemplary of the manner in which the various driving plates of FIG. 2 may be driven in time. Although for simplicity of explanation driving signal source 18 is shown in FIG. 2 coupled only to X-drive plates 5 and 7, it is clear in practice that during the X-drive time interval X-drive plates 9 and 10 are to be driven in the same manner, with X-drive plate 10 being driven simultaneously with X-drive plate 7 during a first subinterval of the X-drive time interval and, then, with all X-drive plates 5, 7, 9 and 10 being driven simultaneously during the remainder of the X-drive time interval. Likewise during the Y-drive time interval Y-drive plates 46 and 48 are first driven and then all Y-drive plates 46, 47, 48 and 49 are simultaneously driven.

Thus, as seen with reference to FIG. 3 during time interval $T_X$ in FIG. 3(*a*): the X-drive signal is applied to effect position sensing in the X-direction and no Y-drive signal is applied to the Y-drive plates. During this interval the Y-direction grid lines and drive plates are tied to ground. During the first subinterval $T_1$, shown in FIG. 3(*c*), of the $T_X$ drive time interval switch 59 in FIG. 2 is closed and switch 61 is grounded thereby grounding plate 5. Thus, only drive plate 7 is being driven with a voltage to be capacitively coupled, via end plates 51, 53, etc. to the X-direction grid lines to be sensed by some form of voltage pickup device. Since the area of drive plate 7 decreases to the left, the voltage coupled to the various capacitance plates 51, 53, etc. decreases to the left and during time interval $T_1$ X-direction position sensing is effective as a function of the amplitude of this voltage. It is clear that likewise during time interval $T_1$ X-drive plate 10 is also being driven and X-drive plate 9 is grounded.

During time interval $T_2$, shown in FIG. 3(*c*), switch 61 is closed and both X-drive plates 5 and 7, as well as redundant plates 9 and 10, are driven by AC signal source 18. During this time interval the complementary X-drive plates provide a constant reference voltage to be used, for example, in accordance with the arrangement described in the above-cited copending application.

During time interval $T_Y$, shown in FIG. 3(*b*), an AC drive signal is applied in similar manner to the Y-drive plates while the X-direction drive plates are grounded. Thus, during interval $T_3$, shown in FIG. 3(*c*), Y-drive plates 46 and 48 in FIG. 2 are simultaneously driven to provide a Y-direction position sample voltage on Y-direction grid lines 31—45 and Y-drive plates 47 and 49 are grounded. Likewise, during time interval $T_4$, shown in FIG. 3(*c*), all Y-drive plates 46, 47, 48 and 49 are driven to provide a fixed reference voltage on the Y-direction grid line.

Any of a variety of switching arrangements not a part of this invention may be employed to control, during the appropriate time interval, the application of the AC drive signals. Exemplary of such switching arrangements are those described in the above-referenced copending application.

It can be seen from FIG. 2 that during the sampling portion $T_1$ of the drive interval $T_X$ drive plate 5 in FIG. 2 acts somewhat in the same manner as plate 19 in FIG. 1. However, instead of providing a fixed capacitance to ground for the array of X-direction grid lines 11—25, plate 5 provides a capacitance which varies as a function of position as the compliment of the capacitance provided by plate 7. Then, during the reference time interval plates 5 and 7 act together to provide a fixed reference voltage on the X-direction grid lines.

The manner in which the complementary plates, for example plates 5 and 7, in FIG. 2 act to provide a first output voltage which is a function of position and, then, a fixed reference voltage can be seen by reference to the capacitances represented by $C_{x_i}$ and $\overline{C}_{x_i}$ at 50 and 52 in FIG. 2.

During interval $T_1$ when only X-drive plate 7 is driven, and X-drive plate 5 is grounded, the output voltage on the X-direction grid lines 11—25 may be represented by:

$$Vo=\frac{C_{x_i}}{C_g+C_{x_i}+\overline{C}_{x_i}}$$

Here, $C_g$ represents the capacitance between the X-direction grid lines and the Y-direction grid lines, where the latter grid lines are grounded through their respective capacitances to Y-drive plates 46—49 during $T_1$, as well as any other stray capacitances to ground. $C_{x_i}$ represents the individual capacitances taken between plate 7 and any of the array of capacitor plates 51, 53, etc. and $\overline{C}_{x_i}$ represents the capacitances between individual ones of the latter and grounded X-drive plate 5. It is clear, here, that $Vo$ varies with $C_{x_i}$ as a function of the geometry of plate 7 in accordance with the numerator, when the denominator remains substantially constant.

Since plates 5 and 7 shown in FIG. 2 are complementary, then, the sum of the respective individual capacitance areas, which areas are shown for example by sections 55 and 57 which are a projection of capacitor plate 53 is constant. With the sum of these areas constant and $C_{x_i}$ and $\overline{C}_{x_i}$ made large compared to $C_g$, it can be seen from the above equation, wherein only X-drive plate 7 is driven, that the signal produced on the array of grid lines 11—25 is a function of the ratio of the capacitance due to sections of plate 7 to the sum of the capacitances due to sections of both plates 5 and 7 and is independent of their absolute values. Thus, $$Vo=\frac{C_{x_i}}{C_{x_i}+\overline{C}_{x_i}}$$

In this respect it can be se^ from this equation that the thickness of the dielectric between plates 5 and 7, so long as uniform in the Y-direction over areas such as 55 and 57, does not affect the value of the output voltage.

If the ratio of the numerator to denominator in the above equation varies linearly, as is the case in the triangular arrangement of FIG. 2, then, the output voltage from grid line to grid line will vary linearly. However, it is evident that this ratio could be made to vary according to any desired function by varying the geometric configuration of plates 5 and 7. Thus, where instead of employing a voltage division arrangement to sense position, two equal frequency phase-shifted signals are employed to drive the transducer so that the degree of phase shift varies with position, nonlinearity in the phase relationship could be corrected by compensating nonlinearity introduced by the geometric configuration of drive plates 5 and 7. Thus, the divisional cut between plates 5 and 7 could be made selectively curved to give a selected nonlinear voltage response on grid lines 11—25 as a function of position along plates 5 and 7.

During time $T_2$ when both X-drive plates 5 and 7 are simultaneously driven, the output voltage is represented by $$Vo=\frac{C_{x_i}+\overline{C}_{x_i}}{C_g+C_{x_i}+\overline{C}_{x_i}}$$

Since, as previously discussed, in the arrangement of FIG. 2 the area represented by 55 is always the complement of the area represented by 57, wherever taken, then, $\overline{C}_{x_i}$ is always the complement of $C_{x_i}$. Since the sum of $C_{x_i}$ and $\overline{C}_{x_i}$ is a constant K, then, $$Vo=K/(K+C_g)$$

It thus can be seen here that $Vo$ is independent of the X position, where $C_g$ is constant with X. If, however, $C_{x_i}$ and $\overline{C}_{x_i}$ are made large compared to $C_g$, then, $$Vo=1$$

and $Vo$ is independent of any possible variations in $C_g$. Thus, it can be seen that so long as a comparatively large rectangular arrangement is used a reference voltage constant with positions can be obtained irrespective of how the plate may be divided to form the complementary pair.

Although discussion of the complementary pair of drive plates has been limited to X-drive plates 5 and 7, it is clear that this discussion applies equally well to all of the complementary drive plates shown in FIG. 2.

Figure 4:
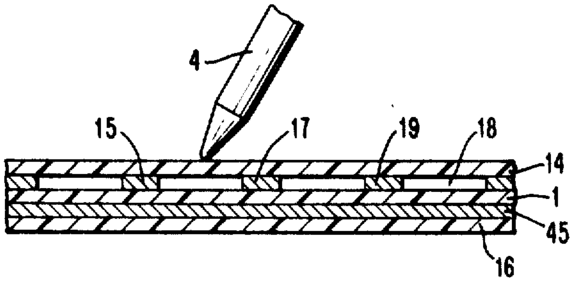
FIG. 4 shows a cross-sectional view of the capacitive voltage divider position transducer of FIG. 2, in a possible writing tablet form.

FIG. 4 shows a portion of the cross-sectional view of the X-Y position transducer arrangement of FIG. 2 in a possible assembled form. The view may be taken, for example, parallel to the Y-grid lines 31—45 shown in FIG. 2. As shown in FIG. 4 dielectric layer 1 may be a sheet of MYLAR of selected thickness and uniformity. On both the top and bottom surfaces of the dielectric layer 1 a conductive layer of, for example, copper may first be deposited. Then, the layers of copper may be etched to form the layers of X and Y grid lines, shown as 15—19 and 45, respectively in FIG. 4. On top of each of the layers of X and Y grid lines another layer of dielectric may be provided, as shown by 14 and 16 in FIG. 4. In addition, further dielectric may be provided between the various grid lines, as shown at 18.

Although the drive plates of FIG. 2 are not shown in FIG. 4 it is clear that they may be fabricated in the same manner as the grid lines. Thus, the X-drive plates may be etched on the bottom surface of dielectric layer 1 along with the Y-grid lines. Likewise, the Y-drive plates may be etched on the upper surface of dielectric layer 4 along with the X-grid lines.

As shown in FIG. 4, when stylus 4 is positioned on or above the layer of dielectric 14 a voltage indicative of the X-Y position of the stylus is capacitively coupled to the stylus. Stylus 4 may comprise a conventional ballpoint pen conductively coupled from its point to an output device. In such an arrangement a writing medium may be interposed between the pen and tablet surface for making hard copy while the movement of the pen is electronically being sensed for information recognition and entry into, for example, a computer.

What we claim is:

1. A capacitive voltage divider comprising:
   a plurality of individual capacitor plate means; and
   plate means coupled to an alternating voltage source and capacitively coupled to each of said plurality of individual capacitor plate means with the area of said plate means capacitively coupled to each of said individual capacitor plate means varying from individual capacitor plate means to individual capacitor plate means over said plurality of individual capacitor plate means so that the capacitance from individual capacitor plate means to individual capacitor plate means varies according to the said varying of said area; and
   means for coupling a further capacitance between each plate means and said alternating voltage source so that the potential at individual ones of said plurality of individual capacitor plate means varies in accordance with the manner in which said capacitance varies.

2. The capacitive voltage divider as set forth in claim 1 wherein said plate means comprises an integral conductive plate with the said area of said plate capacitively coupled to each of said capacitor plate means varying from individual plate to individual plate over said plurality of individual capacitor plate means as a function of the geometric configuration of said plate.

3. The capacitive voltage divider as set forth in claim 2 wherein said means for coupling a further capacitance comprises a plurality of capacitances corresponding in number to the said plurality of individual capacitor plate means wherein said plurality of capacitances are coupled to respective ones of said individual capacitor plate means and wherein a plurality of voltage tap means are respectively coupled to a point between each of said plurality of individual capacitor plate means and said like plurality of capacitances so that the voltage from tap to tap varies according to the said geometric configuration of said plate.

4. The voltage divider as set forth in claim 3 wherein said like plurality of capacitances vary from capacitance to capacitance inversely as the said capacitance from individual plate to individual plate varies.

5. The voltage divider as set forth in claim 4 wherein said like plurality of capacitances comprises a corresponding second plurality of individual capacitor plate means each capacitively coupled to an integral conductive plate which has a geometric configuration which is the complement of the said geometric configuration.

6. The voltage divider as set forth in claim 5 wherein said first recited plurality of individual capacitor plate means and said corresponding second plurality of individual capacitor plate means are respectively in integral form.

7. A voltage divider device comprising:
   a first plurality of capacitive plate areas conductively coupled together and varying in area from plate area to plate area;
   a second plurality of capacitive plates individual ones of which are capacitively coupled to respective individual ones of said first plurality of plate areas so that the capacitance between respective ones of said first plurality of plate areas and said second plurality of plates varies in accordance with the said varying area; and a plurality of capacitance means individual ones of which are respectively coupled to individual ones of said second plurality of capacitive plates so that an alternating voltage potential applied between said plurality of capacitance means and said first plurality of capacitive plate areas is respectively divided in accordance with the capacitance of individual ones of said plurality of capacitance means and the capacitance between corresponding respective ones of said first plurality of plate areas and said second plurality of plates.

8. The voltage divider device as set forth in claim 7 wherein said plurality of capacitance means comprises a third plurality of capacitance plates individual ones of which are conductively coupled to respective individual ones of said second plurality of capacitive plates and a fourth plurality of capacitive plate areas conductively coupled together with individual ones of said capacitive plate areas capacitively coupled to respective individual ones of said third plurality of capacitance plates.

9. The voltage divider device as set forth in claim 8 wherein individual ones of said third plurality of capacitance plates are integral with respective individual ones of said second plurality of capacitive plates and said fourth plurality of capacitance plates vary in area from plate area to plate area as the complement of the said varying in area from plate area to plate area of said first plurality of capacitive plates.

10. The voltage divider device as set forth in claim 8 wherein said first plurality of capacitive plate areas are in integral form so as to comprise a first single plate, wherein individual ones of said third plurality of capacitance plates are integral with corresponding respective individual ones of said second plurality of capacitance plates and wherein said fourth plurality of capacitance plates are in integral form so as to comprise a second single plate.

11. The voltage divider device as set forth in claim 10 wherein said first single plate in uniformly conductive and varies geometrically thereby providing the said varying in area.

12. The voltage divider device as set forth in claim 11 wherein said second plate is uniformly conductive and varies geometrically as the complement of said first plate.

13. The voltage divider d5vice as set forth in claim 12 wherein said first and second plates are triangular in shape.

14. A voltage divider for a position transducer comprising:

first drive plate means having a plurality of conductive plate segments with said plate segments conductively coupled together and varying in area from plate segment to plate segment;

a plurality of individual coupling plates individual ones of which are capacitively coupled to respective individual ones of said plurality of plate segments so that the respective capacitances between individual ones of said plurality of individual coupling plates and the corresponding individual ones of said plurality of plate segments vary in accordance with the said varying in area;

a plurality of position sensing grid lines with individual ones of said plurality of grjd lines connected respectively to individual ones of said plurality of individual coupling plates; and means coupling a varying voltage between said drive plate means and respective ones of said individual coupling plates so that said varying voltage is divided at said grid lines in accordance with said respective capacitances.

15. The voltage divider as set forth in claim 14 wherein each of said plurality of position sensing grid lines is integral with the corresponding one of said plurality of individual coupling plates to which it is connected.

16. The voltage divider as set forth in claim 14 wherein said first drive plate means comprise a first conductive drive plate having a predetermined geometric configuration so that said plurality of plate segments vary in area from plate segment to plate segment according to said predetermined geometric configuration.

17. The voltage divider as set forth in claim 16 wherein said configuration is triangular.

18. The voltage divider as set forth in claim 16 wherein individual ones of said plurality of individual coupling plates are further capacitively coupled to respective individual ones of the plurality of plate segments of a second conductive drive plate means wherein said varying voltage is thereby coupled to respective individual ones of said plurality of individual coupling plates through said second conductive drive plate.

19. The voltage divider as set forth in claim 18 wherein the respective said plate segments of said first conductive drive plate means linearly vary in area from plate segment to plate segment and the respective sums of the areas of individual ones of said plurality of segments of said first conductive drive plate means and corresponding individual ones of said plurality of segments of said second conductive drive plate means, wherein corresponding individual ones are capacitively coupled to respective individual ones of said plurality of individual coupling plates, are constant over said plurality of individual coupling plates.

20. The voltage divider as set forth in claim 19 wherein the said first and second conductive drive plates are triangular.

21. A voltage divider position transducer with capacitive transducer driving means, said transducer driving means including X-direction drive means comprising a first plurality of capacitive coupling plate means conductively coupled together and varying in area from coupling plate means to coupling plate means and a first plurality of individual coupling plates capacitively coupled to respective individual ones of said plurality of capacitive coupling plate means so that the capacitance between respective individual ones of said first plurality of individual coupling plates and the corresponding individual ones of said first plurality of coupling plate means varies in accordance with the said varying in area from coupling plate means to coupling plate means so as to thereby form a first plurality of capacitance varying in value from capacitance to capacitance and means coupling a varying voltage between said first plurality of capacitive coupling plate means and respective ones of said first plurality of individual coupling plates so that said varying voltage is divided at said individual coupling plates in accordance with said capacitance whereby variations in divided voltage are indicative of position.

22. The position transducer as set forth in claim 21 wherein individual ones of a plurality of X-direction position sensing grid lines means for said position transducer are respectively coupled at one end to individual ones of said first plurality of individual coupling plates of said X-direction drive means.

23. The position transducer as set forth in claim 22 wherein said transducer driving means further includes a second X-direction drive means similar to the first recited X-direction drive means wherein individual ones of the first plurality of individual coupling plates of said second X-direction drive means are arranged similar to the said first plurality of individual coupling plates of said first recited X-direction drive means and are respectively coupled to the opposite ends of individual ones of said plurality of grid lines.

24. The position transducer as set forth in claim 22 wherein the said means coupling a varying voltage of said X-direction drive means includes a second plurality of capacitive coupling plate means conductively coupled together and varying in area from coupling plate means to coupling plate means and a second plurality of individual coupling plates individual ones of which are both conductively coupled to respective individual ones of said first plurality of individual coupling plates and capacitively coupled to respective individual ones of said second plurality of capacitive coupling plate means so that the capacitance between respective individual ones of said second plurality of coupling plates and individual ones of said second plurality of coupling plate means varies in accordance with the said varying in area from coupling plate means to coupling plate means of said second plurality of capacitive coupling plate means whereby a second plurality of varying capacitance respectively coupled to said first plurality of varying capacitance is provided.

25. The position transducer as set forth in claim 24 wherein the said varying in area from coupling plate means to coupling plate means of said first plurality of capacitive coupling plate means is linear so that said first plurality of capacitance varies linearly from capacitance to capacitance.

26. The position transducer as set forth in claim 25 wherein the said varying in area from coupling plate means to coupling plate means of said second plurality of capacitive coupling plate means is linear and the respective sums of the areas of individual ones of said first plurality of capacitive coupling plate means and the corresponding individual ones of said second plurality of capacitive coupling plate means are constant from sum to sum so that the respective sums of individual ones of said first plurality of varying capacitance and the corresponding individual ones of said second plurality of varying capacitance respectively coupled thereto are constant from sum to sum.

27. The position transducer as set forth in claim 26 wherein the said first plurality of capacitive coupling plate means and the said second plurality of capacitive coupling plate means each comprise a triangular conductive plate to form a complementary pair of drive plates, one being the complement of the other such that the said sums of said area and the said sums of said capacitance are constant in accordance therewith.

28. The position transducer as set forth in claim 27 wherein each of the plates of said second plurality of individual coupling plates are respectively integral with the corresponding ones of said first plurality of individual coupling plates thereby forming a plurality of individual integral coupling plates to be shared by each of the triangular conductive plates comprising said first and second plurality of capacitance coupling plate means.

29. The position transducer as set forth in claim 29 wherein said driving means further includes Y-direction drive means the same as the recited X-direction drive means and wherein individual ones of a plurality of Y-direction position sensing grid line means for said position transducer are respectively coupled at one end to individual ones of the plurality of individual integral coupling plates of said Y-direction drive means.

30. The position transducer as set forth in claim 29 wherein said driving means includes a second X-direction drive means and a second Y-direction drive means respectively the same as the recited X-direction drive means and Y-direction drive means with individual ones of their respective plurality of individual integral coupling plates respectively coupled to the opposite ends of individual ones of the respective plurality of X-direction grid lines and Y-direction grid lines.

31. The position transducer as set forth in claim 29 wherein said driving means further includes means for alternately energizing one of said X-direction and Y-direction drive means with said varying voltage so that during a first time interval one of the triangular conductive plates of said complementary pair of drive plates is energized to provide a voltage distribution on the position sensing grid lines corresponding thereto as a linear function of position and during a second time interval both of the triangular conductive plates of said complementary pair of drive plates are energized to provide a voltage distribution on said grid lines which is constant with position.

32. A capacitive voltage divider for a position transducer comprising:

first and second conductive plates;

a plurality of capacitance plates each coupled to both said first and second conductive plates so that the area of respective individual ones of said plurality of plates capacitively coupled to one of said first and second conductive plates varies over said plurality from one to another and so that each of the sums of the capacitance area of said first and second conductive plates capacitively coupled to the respective plates of said plurality of capacitance plate is equal;

a plurality of position sensing grid lines with individual ones of said plurality of grid lines coupled respectively to individual ones of said plurality of capacitance plates; and control circuit means including means for energizing said first conductive plate with an alternating voltage when said second conductive plate is at a fixed potential so that the respective output voltages on said plurality of grid lines varies as a function of the geometric configuration of said first plate.

33. The capacitive voltage divider as set forth in claim 32 wherein the respective areas of said first conductive plate capacitively coupled to respective ones of said plurality of capacitance plates vary linearly in size from area to area.

34. The capacitive voltage divider as set forth in claim 33 wherein said control circuit means further include means for energizing said second conductive plate so that the respective output voltages on said plurality of grid lines is constant from grid line to grid line.